United States Patent
Rothstein et al.

(10) Patent No.: US 9,539,918 B2
(45) Date of Patent: Jan. 10, 2017

(54) ADJUSTABLE VEHICLE SEAT

(71) Applicant: Johnson Controls GmbH, Burscheid (DE)

(72) Inventors: Gerhard Rothstein, Velbert (DE); Michael Fahl, Overath (DE)

(73) Assignee: Johnson Controls GmbH, Burscheid (DE)

( * ) Notice: Subject to any disclaimer, the term of this patent is extended or adjusted under 35 U.S.C. 154(b) by 86 days.

(21) Appl. No.: 14/412,052

(22) PCT Filed: Jul. 25, 2013

(86) PCT No.: PCT/EP2013/065724
§ 371 (c)(1),
(2) Date: Dec. 30, 2014

(87) PCT Pub. No.: WO2014/019933
PCT Pub. Date: Feb. 6, 2014

(65) Prior Publication Data
US 2015/0151654 A1    Jun. 4, 2015

(30) Foreign Application Priority Data

Jul. 31, 2012 (DE) .......................... 10 2012 015 294

(51) Int. Cl.
*B60N 2/20* (2006.01)
*B60N 2/30* (2006.01)
(Continued)

(52) U.S. Cl.
CPC ................. *B60N 2/206* (2013.01); *B60N 2/22* (2013.01); *B60N 2/309* (2013.01); *B60N 2/3011* (2013.01);
(Continued)

(58) Field of Classification Search
CPC .......... B60N 2/206; B60N 2/22; B60N 2/3011; B60N 2/3031; B60N 2/3065; B60N 2/309; B60N 2/36; B60N 2/366; B60N 2/3047; B60N 2/305
(Continued)

(56) References Cited

U.S. PATENT DOCUMENTS 5,393,116 A * 2/1995 Bolsworth ......... B60N 2/01583
296/65.03
5,662,368 A 9/1997 Ito et al.
(Continued)

FOREIGN PATENT DOCUMENTS

DE          102 97 476 T5    11/2004
DE    10 2004 041 449 B3     3/2006
(Continued)

*Primary Examiner* — Milton Nelson, Jr.
(74) *Attorney, Agent, or Firm* — McGlew and Tuttle, P.C.

(57) ABSTRACT

An adjustable vehicle seat (1) has a seat part (2) and a backrest part (3) which is pivotable relative to the seat part about a backrest pivot axis (6) and is lockable in a design position (the backrest is approximately upright) and in a table position (the backrest rests on the seat part). Two locking devices (90) are kinematically assigned to the seat part and an unlocking unit (10) is kinematically assigned to the backrest, for unlocking the locking devices (90). The unlocking unit (10) is connected to the locking devices (90) by two Bowden cables (83, 84). A passage element (80), that is approximately cylindrical, is fastened to the seat part with a cylinder axis aligned with the backrest pivot axis (6) and with a first Bowden cable passage opening (81) and a second Bowden cable passage opening (82) arranged at a same distance from the backrest pivot axis.

15 Claims, 4 Drawing Sheets

(51) Int. Cl.
*B60N 2/36* (2006.01)
*B60N 2/22* (2006.01)

(52) U.S. Cl.
CPC ........... *B60N 2/3031* (2013.01); *B60N 2/3065* (2013.01); *B60N 2/36* (2013.01); *B60N 2/366* (2013.01)

(58) Field of Classification Search
USPC .................................. 297/378.12, 326, 336
See application file for complete search history.

(56) References Cited

U.S. PATENT DOCUMENTS

| | | | |
|---|---|---|---|
| 6,520,581 B1* | 2/2003 | Tame | B60N 2/206 296/65.01 |
| 8,047,595 B2 | 11/2011 | Bach | |
| 2007/0296257 A1* | 12/2007 | Nathan | B60N 2/206 297/325 |

FOREIGN PATENT DOCUMENTS

| | | |
|---|---|---|
| WO | 03/047908 A2 | 6/2003 |
| WO | 2004/069585 A1 | 8/2004 |

* cited by examiner

ADJUSTABLE VEHICLE SEAT

CROSS REFERENCE TO RELATED APPLICATIONS

This application is a U.S. National Phase Application of International Application PCT/EP2013/065724 filed Jul. 31, 2013 and claims the benefit of priority under 35 U.S.C. §119 of German Patent Application DE 10 2012 015 294.9 filed Jul. 31, 2012, the entire contents of which are incorporated herein by reference.

FIELD OF THE INVENTION

The present invention relates to an adjustable vehicle seat having a seat part and a backrest which can be pivoted relative to the seat part about a backrest pivot axis and can be locked in a design position, in which the backrest is approximately upright, and in a table position, in which the backrest rests on the seat part, the backrest being pivoted about a pivoting angle (A) relative to the table position in the design position, and two locking apparatuses, which are assigned kinematically to the seat part and by means of which the seat part can be locked to a vehicle structure, and an unlocking unit which is assigned kinematically to the backrest for unlocking the locking apparatuses, which unlocking unit is connected to the locking apparatuses by means of Bowden cables.

BACKGROUND OF THE INVENTION

Adjustable vehicle seats which have a seat part and a backrest which is arranged pivotably on the seat part are known by use. In addition, a vehicle seat of this type has two backrest setting fittings, by means of which the backrest can be pivoted about a backrest pivot axis relative to the seat part, and by means of which the backrest can be locked to the seat part in a plurality of angular positions.

Starting from a design position, in which a passenger can be seated and the backrest is approximately vertical, the vehicle seat can be transferred into a table position, in which the backrest rests on the seat part. Here, the rear side of the backrest lies approximately horizontally and the vehicle seat has the function of a table.

Furthermore, it is known that the vehicle seat can be locked to the vehicle structure by means of two locking apparatuses which are attached in the rear region of the seat part. By way of unlocking of the two said locking apparatuses, the rear part of the vehicle seat can be released from the vehicle structure. By way of raising of the rear part of the vehicle seat and pivoting toward the front, the vehicle seat can be transferred into a tumble position, in which additional cargo area is produced.

An unlocking unit which is assigned kinematically to the backrest is provided for unlocking the two locking apparatuses. The unlocking unit is connected to each of the two locking apparatuses by means of in each case one Bowden cable. Here, the locking apparatuses are assigned kinematically to the seat part.

During a pivoting movement of the backrest relative to the seat part from the design position into the table position, the actuating travels of the two Bowden cables can be influenced, in particular can be lengthened or shortened.

U.S. Pat. No. 5,662,368 A has disclosed an adjustable vehicle seat which can be transferred from a design position into a position, in which the backrest rests on the seat part, and which adjustable vehicle seat can be locked to a vehicle structure by means of two locking apparatuses.

DE 102 97 476 T5 has likewise disclosed a vehicle seat of this type.

U.S. Pat. No. 8,047,595 B2 discloses a vehicle seat which can be locked to a vehicle structure by means of two locking apparatuses, it being possible for the locking apparatuses to be unlocked by means of Bowden cables.

SUMMARY OF THE INVENTION

The invention is based on the problem of improving a vehicle seat of the type mentioned at the outset, in particular of insuring constant actuating travels of the two Bowden cables in the design position and the table position.

An adjustable vehicle seat according to the invention comprises a seat part and a backrest which can be pivoted relative to the seat part about a backrest pivot axis and can be locked in a design position, in which the backrest is approximately upright, and in a table position, in which the backrest rests on the seat part, the backrest being pivoted about a pivoting angle relative to the table position in the design position, and two locking apparatuses which are assigned kinematically to the seat part and by means of which the seat part can be locked to a vehicle structure, and an unlocking unit which is assigned kinematically to the backrest for unlocking the locking apparatuses, which unlocking unit is connected to the locking apparatuses by means of two Bowden cables.

According to the invention, a leadthrough element which is assigned kinematically to the seat part is provided, which leadthrough element has a first leadthrough opening for guiding through the first Bowden cable and a second leadthrough opening for guiding through the second Bowden cable, the first leadthrough opening and the second leadthrough opening being arranged at an identical spacing from the backrest pivot axis, and the leadthrough element being of approximately cylindrical configuration and being fastened to the seat part in such a way that its cylinder axis is aligned with the backrest pivot axis.

As a result, the actuating travels of the two Bowden cables are always identically long in the design position and table position. The advantage lies, inter alia, in the fact that the Bowden cable can be set to compensate for tolerances during the mounting of the vehicle seat in the design position, it being ensured that an actuation of the Bowden cables for opening the locking apparatuses is possible later in the table position.

For fastening to the seat part, the leadthrough element advantageously has a radially protruding fastening arm.

A first supporting point, from which the first Bowden cable is guided in a direct line to the first leadthrough opening, and a second supporting point, from which the second Bowden cable is guided in a direct line to the second leadthrough opening, are advantageously at the same spacing from the backrest pivot axis.

According to one advantageous refinement of the invention, a first plane which runs parallel to the backrest pivot axis, on which first plane a first center point of the first leadthrough opening and a second center point of the second leadthrough opening lie, and a second plane which runs parallel to the backrest pivot axis, on which second plane the first supporting point and the second supporting point lie, lie offset with respect to one another by half the pivoting angle in the design position of the backrest.

The first plane and the second plane likewise advantageously lie offset with respect to one another by half the pivoting angle in the table position of the backrest.

Here, the backrest pivot axis preferably lies in the first plane, which is considered to be a special case of parallel arrangement in this context.

The backrest pivot axis likewise preferably lies in the second plane, which is considered to be a special case of parallel arrangement in this context.

A practical construction results if the first supporting point is situated on a first circumferential face of a cylinder segment-like region of a first unlocking element of the unlocking device, and the second supporting point is situated on a second circumferential face of a cylinder segment-like region of a second unlocking element of the unlocking device.

Here, a first guide groove is advantageously formed in the first circumferential face, into which first guide groove the first Bowden cable is inserted, and a second guide groove is formed in the second circumferential face, into which second guide groove the second Bowden cable is inserted.

In order to introduce casings of the Bowden cables, the leadthrough element preferably has at least one radially protruding collar.

According to one advantageous development of the invention, in the design position, the leadthrough element prevents a movement of an unlocking lever of the unlocking device for unlocking the locking apparatuses.

To this end, on one end side, the leadthrough element preferably has at least one diametrically running slot which interacts with a blocking lug which is attached to the unlocking lever.

Here, the leadthrough element is advantageously arranged in such a way that, when the vehicle seat is situated in the design position, the slot runs obliquely with respect to the movement direction of the blocking lug.

Furthermore, the leadthrough element is advantageously arranged in such a way that, when the vehicle seat is situated in the table position, the slot runs in the same direction as the movement direction of the blocking lug.

Here, during pivoting of the backrest from the design position into the table position, the leadthrough element rotates relative to the unlocking unit.

In the following text, the invention is explained in greater detail using one advantageous exemplary embodiment which is shown in the drawings. However, the invention is not restricted to said exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 3:
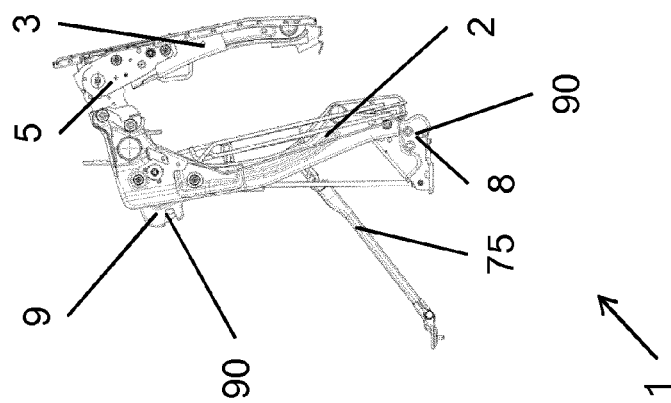
FIG. 3 is a diagrammatic illustration of a vehicle seat in the tumble position.

A vehicle seat 1 for a motor vehicle has a seat part 2 and a backrest 3. The arrangement of the vehicle seat 1 within the vehicle and its usual driving direction define the direction information used in the following text. Here, a direction which is oriented perpendicularly with respect to the ground will be called the vertical direction in the following text and a direction perpendicular with respect to the vertical direction and perpendicular with respect to the driving direction will be called the transverse direction in the following text.

The backrest 3 is attached to the seat part 2 such that it can be pivoted about a backrest pivot axis 6 which runs in the transverse direction, and comprises, inter alia, a backrest plate 4. By means of two backrest setting fittings 5 which are configured as latching fittings in the present case, the backrest 3 can be set in a plurality of discrete angular positions relative to the seat part 2. A backrest setting fitting of this type is disclosed, for example, in DE 10 2004 041 449 B3, the disclosure of which in this regard is incorporated here expressly.

A headrest which is of height-adjustable and inclination-adjustable configuration in the present case is attached at one end of the backrest 3, which end faces away from the seat part.

Figure 2:
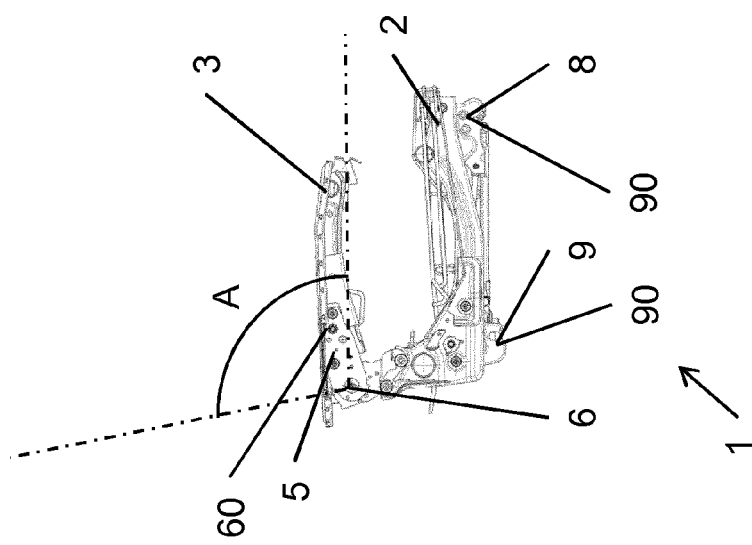
FIG. 2 is a diagrammatic illustration of a vehicle seat in the table position.
Figure 1:
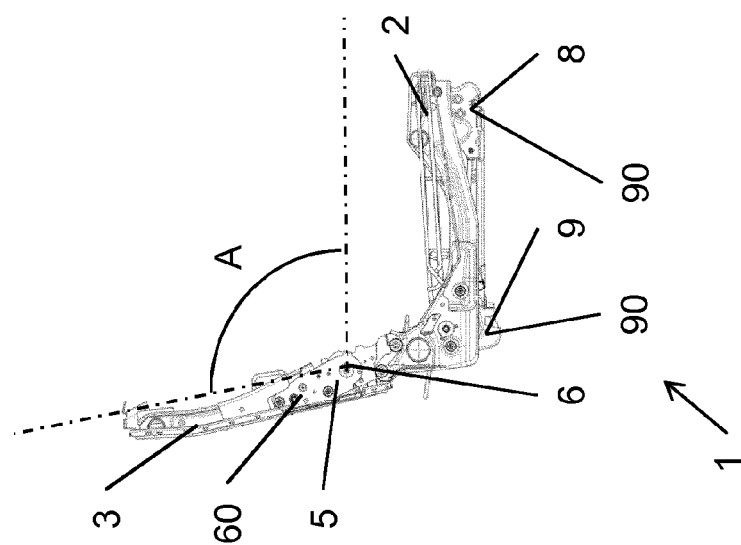
FIG. 1 is a diagrammatic illustration of a vehicle seat in the design position.

In the design position of the vehicle seat 1 which is shown in FIG. 1, the backrest 3 is in an approximately vertical position. By way of unlocking of the backrest setting fittings 5 and pivoting of the backrest 3 into a horizontal position, the vehicle seat 1 can be transferred into a table position. In the table position which is shown in FIG. 2, the backrest 3 rests on the seat part 2 and runs approximately parallel to the latter and parallel to the vehicle floor. In the design position, the backrest 3 is pivoted here by a pivoting angle (A) relative to the table position.

The seat part 2 is connected releasably to the vehicle structure. To this end, the seat part 2 has in each case one front foot 8 on both sides in the front region in the driving direction, which front foot 8 comprises a locking apparatus 90. Furthermore, the seat part 2 has in each case one rear foot 9 on both sides in the rear region in the driving direction, which rear foot 9 comprises a locking apparatus 90. A locking apparatus of this type is disclosed, for example, in WO 2004 069 585 A1, the disclosure of which in this regard is incorporated here expressly.

In the design position and in the table position of the vehicle seat 1, the locking apparatuses 90 are locked to pins which are attached to the vehicle structure. In order to transfer the vehicle seat 1 from the table position into a tumble position, the two locking apparatuses 90 of the rear feet 9 are unlocked simultaneously, as a result of which the rear feet 9 are released from the vehicle structure.

In the tumble position which is shown in FIG. 3, the backrest 3 rests on the seat part 2 and runs approximately parallel to the latter. The vehicle seat 1 is folded forward and the backrest 3 and the seat part 2 are inclined relative to the vehicle floor. Here, the vehicle seat 1 is held in the tumble position by means of a strut 75.

For safety reasons, the two locking apparatuses 90 of the rear feet 9 must not be unlocked in the design position, but rather merely in the table position. In the tumble position, the locking apparatuses 90 are unlocked. The locking apparatuses 90 may therefore be unlocked only when the backrest 3 rests on the seat part 2.

For safety reasons, the two backrest setting fittings 5 must likewise not be unlocked in the tumble position, but rather merely in the table position and in the design position. The backrest setting fittings 5 may therefore be unlocked only when both locking apparatuses 90 are locked.

The vehicle seat 1 comprises a locking unit 50 which is also called an interlocking unit and will be described in greater detail in the following text and which ensures that the above-described unlocking processes can be carried out only in the correspondingly defined positions of the vehicle seat 1.

A transmission rod 60 which is assigned kinematically to the backrest 3 runs parallel to the backrest pivot axis 6. The transmission rod 60 is connected to both backrest setting fittings 5 which are attached to the side of the vehicle seat 1 and serves for simultaneous unlocking of both backrest setting fittings 5. The transmission rod 60 is arranged on the front side in the driving direction of the backrest plate 4.

Unlocking of the backrest setting fittings 5 takes place by way of rotation of the transmission rod 60 by a predefined angle about its center axis which runs in the transverse direction. If the backrest setting fittings 5 are unlocked, the backrest 3 can be pivoted relative to the seat part 2 about the backrest pivot axis 6.

In the design position, in the table position and in the tumble position, the backrest setting fittings 5 are locked in each case. The backrest setting fittings 5 are unlocked merely during a pivoting movement of the backrest 3.

An unlocking unit 10 is provided for simultaneous unlocking of both locking apparatuses 90 of the rear feet 9, which unlocking unit 10 is fastened to the backrest plate 4 and is therefore likewise assigned kinematically to the backrest 3. Here, the unlocking unit 10 is arranged on the front side in the driving direction of the backrest plate 4.

The unlocking unit 10 comprises a base plate 70 which is arranged largely parallel to the backrest plate 4 and which, together with the backrest plate 4, forms a partial encapsulation of the remaining parts of the unlocking unit 10.

An unlocking lever 30 is mounted such that it can be pivoted about an actuating pivot axis 44. A return spring (not shown) loads the unlocking lever 30 constantly in the direction of a rest position.

On an arm which protrudes in the radial direction, the unlocking lever 30 has a belt eye 31, into which a belt strap 62 which serves as actuating element is hooked. The belt strap 62 runs first of all from the belt eye 31 in the vertical direction to a deflection bracket 73.

The belt strap 62 is deflected on the deflection bracket 73 counter to the driving direction and is guided to a belt opening 66 in the backrest plate 4. The belt strap 62 is guided through the belt opening 66 and protrudes out of the backrest 3 counter to the driving direction, that is to say toward the rear.

By way of pulling on that end of the belt strap 62 which protrudes out of the backrest 3, the unlocking lever 30 is pivoted about the actuating pivot axis 44 in the direction of its actuating position. A limiting element (not shown) acts as a stop and limits the movement of the unlocking lever 30 after the actuating position is reached.

A control gearwheel 20 is mounted such that it can be rotated about a control pivot axis 43 which runs parallel to the actuating pivot axis 44. Approximately along half its circumference, the control gearwheel 20 has a control toothing system which meshes with an unlocking toothing system 33 of the unlocking lever 30.

A first unlocking element 11 is mounted axially next to the control gearwheel 20 such that it can be rotated about the control pivot axis 43. The first unlocking element 11 has, inter alia, a cylinder segment-like region with a first circumferential face 55, in which a first guide groove 15 is formed. A first Bowden cable 83 is inserted into the first guide groove 15. At its end, the first Bowden cable 83 has a first nipple 85 which is hooked into a first Bowden cable hook-in means 13 of the first unlocking element 11.

The first Bowden cable 83 runs from the first unlocking element 11 to a leadthrough element 80 which is fastened to the seat part 2. In this case, a point, at which the first Bowden cable 83 leaves the first guide groove 15 tangentially and is guided in a direct line to a first leadthrough opening 81 of the leadthrough element 80, is called a first supporting point 87. The first Bowden cable 83 runs further through the first leadthrough opening 81 of the leadthrough element 80 to one of the two locking apparatuses 90 in one of the rear feet 9.

A second unlocking element 12 is likewise mounted axially next to the control gearwheel 20 such that it can be rotated about the control pivot axis 43. The second unlocking element 12 has, inter alia, a cylinder segment-like region with a second circumferential face 56, in which a second guide groove 16 is formed. A second Bowden cable 84 is inserted into the second guide groove 16. At its end, the second Bowden cable 84 has a second nipple 86 which is hooked into a second Bowden cable hook-in means 14 of the second unlocking element 12.

The second Bowden cable 84 runs from the second unlocking element 12 to the leadthrough element 80 which is fastened to the seat part 2. In this case, a point, at which the second Bowden cable 84 leaves the second guide groove 16 tangentially and is guided in a direct line to a second leadthrough opening 82 of the leadthrough element 80, is called a second supporting point 88. The second Bowden cable 84 runs further through the second leadthrough opening 82 of the leadthrough element 80 to the other of the two locking apparatuses 90 in one of the rear feet 9.

A first plane 51 is defined by the center point of the first leadthrough opening 81, the center point of the second leadthrough opening 82 and the backrest pivot axis 6. A second plane 52 is defined by the first supporting point 87, the second supporting point 88 and the backrest pivot axis 6.

If the unlocking unit 10 is situated in the starting position, the unlocking lever 30 is situated in the rest position, the control gearwheel 20 is situated in the locking position, the unlocking elements 11, 12 are situated in the locking position, and the two locking apparatuses 90 are locked. If the unlocking unit 10 is situated in the activation position, the unlocking lever 30 is situated in the actuating position, the control gearwheel 20 is situated in the unlocking position, the unlocking elements 11, 12 are situated in the unlocking position, and the two locking apparatuses 90 are unlocked.

A control spring (not shown) is provided between the control gearwheel 20 and the first unlocking element 11, which control spring loads the first unlocking element 11 relative to the control gearwheel 20 toward the unlocking position. A control spring is likewise provided between the control gearwheel 20 and the second unlocking element 12, which control spring loads the second unlocking element 12 relative to the control gearwheel 20 toward the unlocking position. Here, the two control springs are configured in the present case as swivel pin springs and are plugged into corresponding openings in the unlocking elements 11, 12 and the control gearwheel 20. Here, the control gearwheel 20 is arranged between the first unlocking element 11 and the second unlocking element 12 in the axial direction with regard to the control pivot axis 43. The two control springs are situated in each case between the control gearwheel 20 and the associated unlocking element 11, 12.

In the starting position of the unlocking unit 10, a comparatively short end of the belt strap 62 protrudes out of the backrest 3 toward the rear. This signals to a user that both locking apparatuses 90 are locked.

By way of pulling on that end of the belt strap 62 which protrudes out of the backrest 3, the unlocking lever 30 is pivoted in the direction of the actuating position counter to the force of the return spring. Here, the control gearwheel 20 is rotated in the direction of the unlocking position. After the control gearwheel 20 has passed through an idle travel, a driver 24 which is attached to the control gearwheel 20 comes into contact with a first counterstop 17 of the first unlocking element 11 and with a second counterstop 18 of the second unlocking element 12.

In the present case, the driver 24 is attached in a region of the control gearwheel 20, which region lies diametrically opposite the control toothing system, and protrudes in the axial direction on both sides from said control gearwheel 20. The counterstops 17, 18 of the unlocking elements 11, 12 are configured substantially as smooth surfaces which run in the radial and axial direction.

By way of further pulling on the end of the belt strap 62, the control gearwheel 20 drives the unlocking elements 11, 12, as a result of which the latter are rotated in the direction of the unlocking position. Here, pulling takes place on the Bowden cables 83, 84, as a result of which the locking apparatuses 90 are unlocked. This movement ends when the unlocking lever 30 bears against the limiting element and the unlocking unit 10 is situated in the activation position. The belt strap 62 then protrudes comparatively far out of the backrest 3. This signals to a user that at least one of the two locking apparatuses 90 is unlocked.

If the user then releases the belt strap 62, the unlocking lever 30 is pivoted in the direction of the rest position by way of the force of the return spring. As a result, the control gearwheel 20 is also rotated in the direction of the locking position and the driver 24 moves away from the counterstops 17, 18 of the unlocking elements 11, 12. The unlocking elements 11, 12 remain in the unlocking position, on account of the loading by way of the control springs.

The movement of the unlocking lever 30 ends when a stop element 34 of the unlocking lever 30 bears against the first circumferential face 55 and/or against the second circumferential face 56. In the present case, the stop element 34 is of cylindrical configuration and is attached to the arm of the unlocking lever 30. The stop element 34 is arranged closer in the radial direction to the actuating pivot axis 44 than the belt eye 31 and protrudes in the axial direction on both sides from the arm.

The unlocking lever 30 is now situated in the hold-open position and the unlocking unit 10 is situated in the display position. Although, in comparison to the activation position, the belt strap 62 is pulled partially into the backrest 3, it still protrudes comparatively far out of the backrest 3. This signals to a user that at least one of the two locking apparatuses 90 is unlocked.

The rear feet 9 of the vehicle seat 1 can then be removed from the vehicle structure, and the vehicle seat 1 can be folded forward into the tumble position.

The vehicle seat 1 can tilt when the rear feet 9 are again placed onto the pins of the vehicle structure. Here, only one of the two locking apparatuses 90 locks to the associated pin in the vehicle structure, whereas the other of the two locking apparatuses 90 does not lock or locks only with a delay to the assigned pin in the vehicle structure.

For example, after the rear feet are placed onto the pins, the locking apparatus 90 which is connected to the first unlocking element 11 is unlocked, and the locking apparatus 90 which is connected to the second unlocking element 12 is locked. During locking, the locking apparatus 90 which is connected to the second unlocking element 12 pulls on the second Bowden cable 84, as a result of which the second unlocking element 12 is rotated into the locking position. However, the first unlocking element 11 remains in the unlocking position.

Here, the stop element 34 of the unlocking lever 30 loses contact with the second circumferential face 56, but still bears against the first circumferential face 55. The unlocking lever 30 therefore remains in the hold-open position and the belt strap 62 still protrudes comparatively far out of the backrest 3. It is therefore signaled to a user that at least one of the two locking apparatuses 90 is unlocked.

If the locking apparatus 90 which is connected to the first unlocking element 11 now also locks, it pulls on the first Bowden cable 83, as a result of which the first unlocking element 11 is also rotated into the locking position. Here, the stop element 34 of the unlocking lever 30 also loses contact with the first circumferential face 55, and the unlocking lever 30 is rotated back into the rest position by way of the force of the return spring. Here, the control gearwheel 20 is also rotated back into the locking position.

The unlocking unit 10 is therefore situated in the starting position again. Here, the belt strap 62 is pulled by the unlocking lever 30 into the backrest 3 to such an extent that only a comparatively short end of the belt strap 62 is still visible from the outside. This signals to a user that both locking apparatuses 90 are locked.

Close to the unlocking unit 10, a blocking lever 54 is attached on the transmission rod 60 and is connected fixedly to the latter so as to rotate with it. During unlocking of the backrest setting fittings 5, the blocking lever 54 is also pivoted correspondingly. The unlocking lever 30 has a blocking arm 36 which interacts with the blocking lever 54.

In the design position and in the table position, the unlocking lever 30 is situated in each case in the rest position, the blocking arm 36 being situated laterally next to the blocking lever 54. During unlocking of the backrest setting fittings 5, the blocking lever 54 pivots laterally past the blocking arm 36. Unlocking of the backrest setting fittings 5 is therefore possible in the design position and in the table position of the vehicle seat 1. The blocking arm 36 likewise pivots past the blocking lever 54 during unlocking of the locking apparatuses 90. Unlocking of the locking apparatuses 90 is therefore possible in the design position and in the table position of the vehicle seat 1.

During the unlocking of the backrest setting fittings 5, that is to say as long as the backrest setting fittings 5 are unlocked, the blocking lever 54 is situated in front of the blocking arm 36. During the attempt to unlock the locking apparatuses 90, the blocking arm 36 of the unlocking lever 30 comes into contact with the blocking lever 54. Unlocking of the locking apparatuses 90 when the backrest setting fittings 5 are unlocked is therefore not possible.

In the tumble position, the unlocking lever 30 is situated in the hold-open position. Here, the blocking arm 36 is situated immediately in front of the blocking lever 54.

During the attempt to unlock the backrest setting fittings 5, the blocking lever 54 comes into contact with the blocking arm 36. Unlocking of the backrest setting fittings 5 is therefore not possible in the tumble position of the vehicle seat 1.

The leadthrough element 80 which is fastened to the seat part 2 is of approximately cylindrical design, its cylinder axis being aligned with the backrest pivot axis 6. The leadthrough element 80 is therefore assigned kinematically to the seat part 2. During pivoting of the backrest 3 from the design position into the table position, the leadthrough element 80 therefore rotates relative to the unlocking unit 10.

Figure 4:
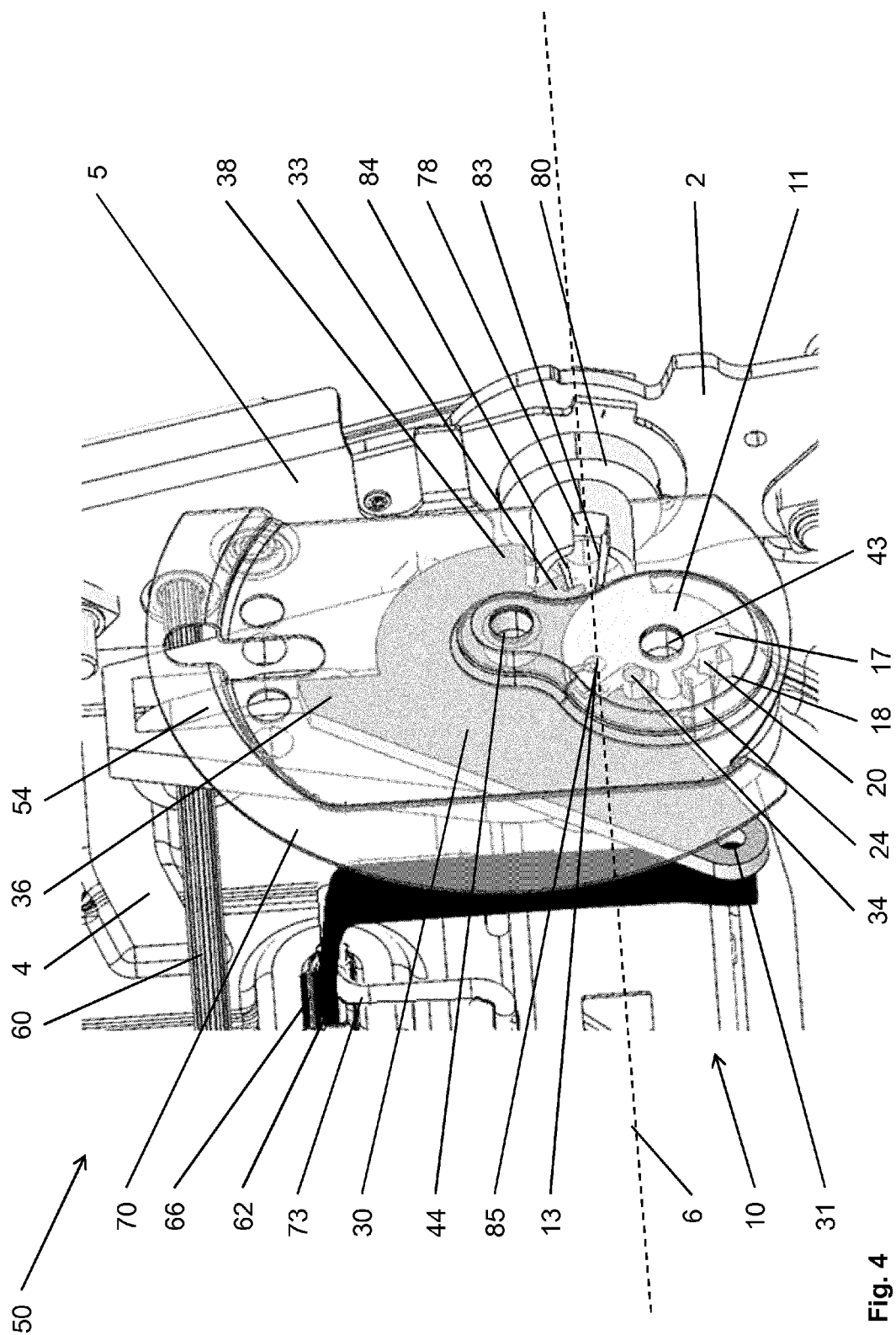
FIG. 4 is a perspective illustration of a locking unit.
Figure 6:
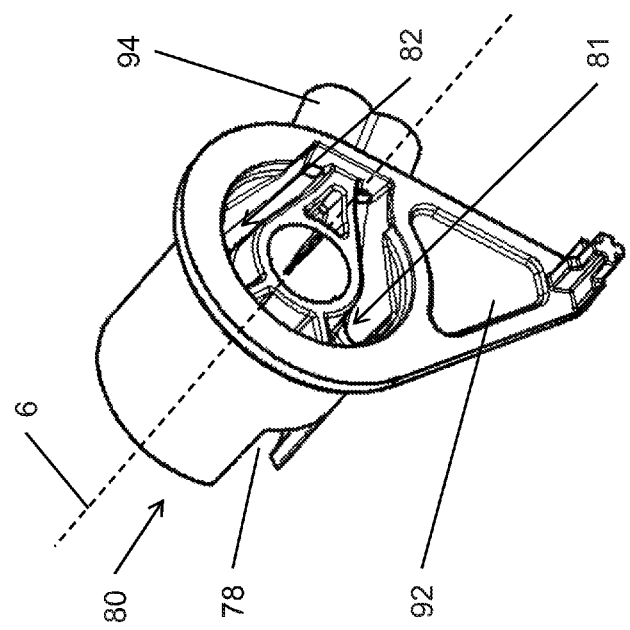
FIG. 6 is a perspective illustration of the leadthrough element according to FIG. 5 from another perspective.
Figure 5:
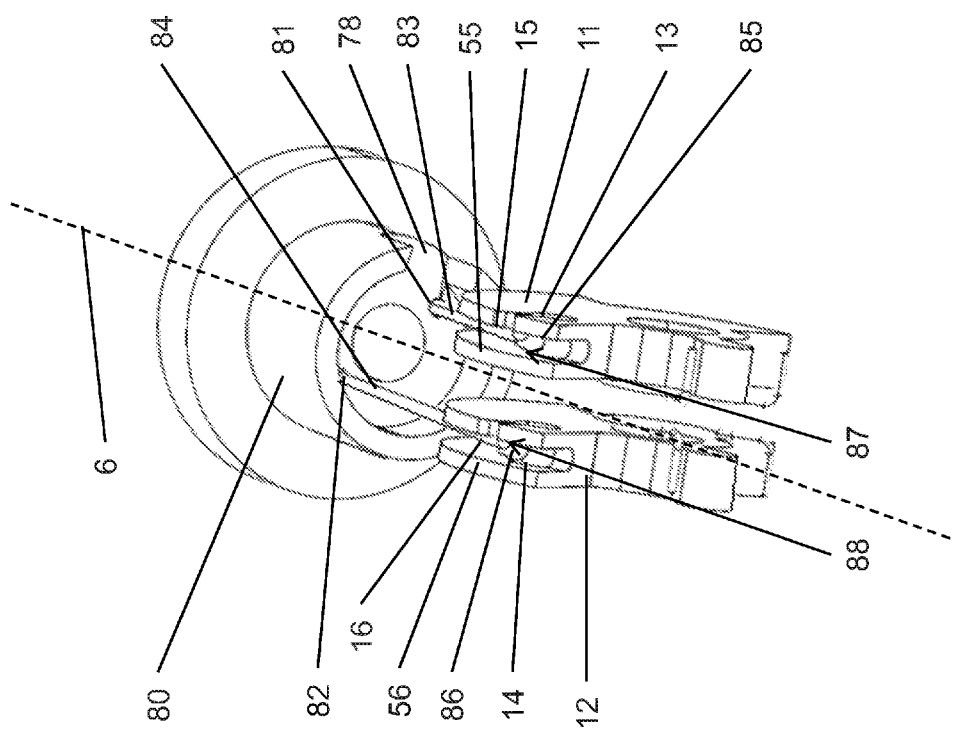
FIG. 5 is a perspective illustration of a leadthrough element.

In a radially protruding manner, the leadthrough element 80 has a fastening arm 92 which serves for fastening to the seat part 2, and which is not shown in the illustrations in FIG. 4 and FIG. 5. Furthermore, in a radially protruding manner, the leadthrough element 80 has a collar 94, into which casings of the Bowden cables 83, 84 can be introduced. The collar 94 is likewise not shown in the illustrations in FIG. 4 and FIG. 5.

The leadthrough element 80 has a diametrically running slot 78 on an end side which points in the transverse direction to the interior of the vehicle seat 1, that is to say faces the unlocking unit 10. The leadthrough element 80 is arranged in such a way that, when the vehicle seat 1 is situated in the table position, the slot 78 is aligned with a blocking lug 38 which is attached to the unlocking lever 30.

When the vehicle seat 1 is situated in the design position, the slot 78 runs obliquely with respect to the movement direction of the blocking lug 38. During the attempt to unlock the locking apparatuses 90, the blocking lug 38 of the unlocking lever 30 comes into contact with the cylinder shell of the leadthrough element 80. Unlocking of the locking apparatuses 90 is therefore not possible when the vehicle seat 1 is situated in the design position.

When the vehicle seat 1 is situated in the table position, the slot 78 runs in the same direction as the movement direction of the blocking lug 38. During unlocking of the locking apparatuses 90, the blocking lug 38 pivots into the slot 78. Unlocking of the locking apparatuses 90 is therefore possible in the table position of the vehicle seat 1.

In the tumble position, the unlocking lever 30 is situated in the hold-open position. Here, the blocking lug 38 of the unlocking lever 30 is situated within the slot 78 of the leadthrough element 80. In the tumble position, as described above, unlocking of the backrest setting fittings 5 is not possible. Even if the backrest setting fittings 5 were unlocked in the tumble position, a pivoting movement of the backrest 3 relative to the seat part 2 would not be possible. In this case, the edge regions of the slot 78 would come into contact with the blocking lug 36 and prevent a pivoting movement of the backrest 3 relative to the seat part 2.

Figure 8:
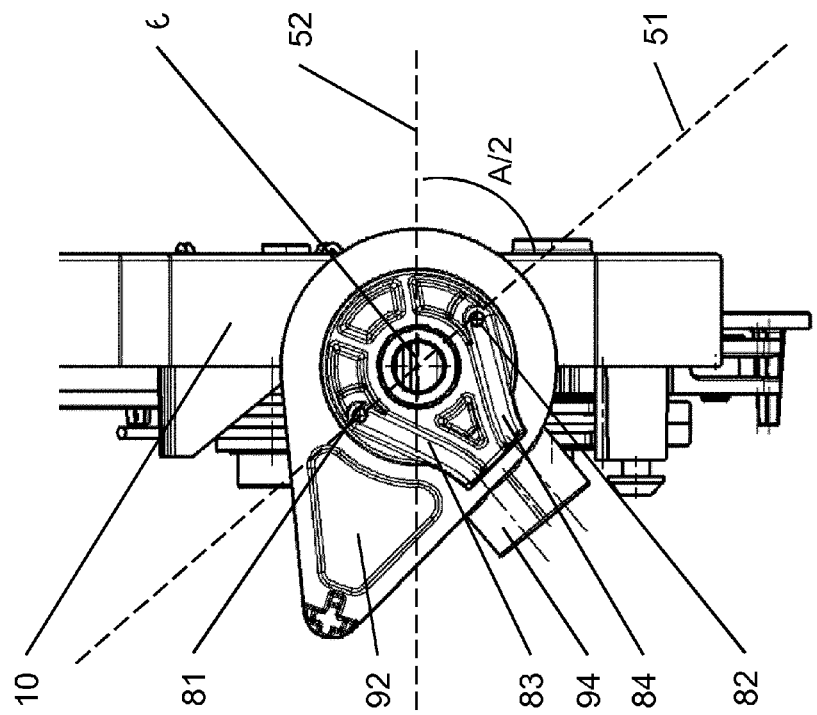
FIG. 8 is a side view of the leadthrough element according to FIG. 5 in the table position.
Figure 7:
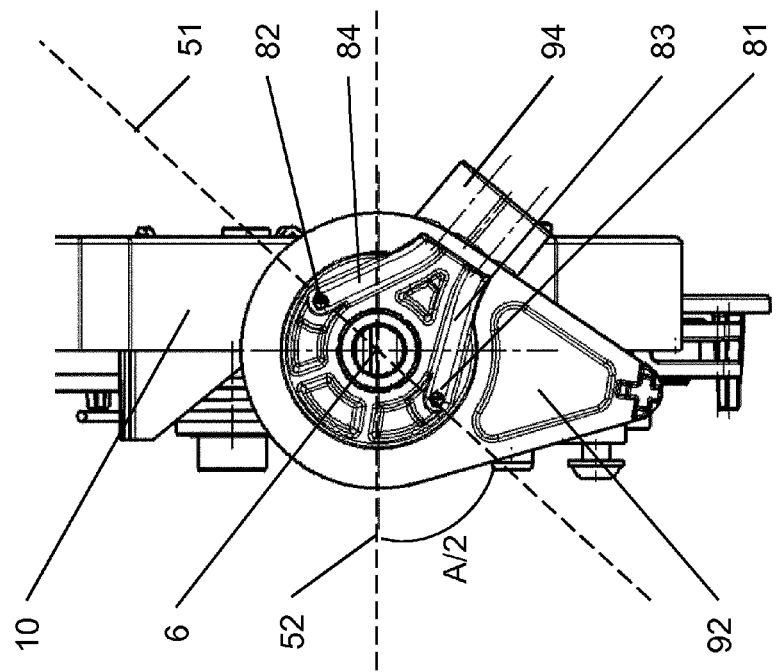
FIG. 7 is a side view of the leadthrough element according to FIG. 5 in the design position.

In the design position which is shown in FIG. 7, the first plane 51 is offset by half the pivoting angle A relative to the second plane 52. In the table position which is shown in FIG. 8, the first plane 51 is likewise offset by half the pivoting angle A relative to the second plane 52. In the table position which is shown in FIG. 8, the first plane 51 is offset by the pivoting angle A relative to its position shown in FIG. 7 in the design position.

The features which are disclosed in the above description, the claims and the drawings can be of significance both individually and in combination for the realization of the invention in its different refinements.

While specific embodiments of the invention have been shown and described in detail to illustrate the application of the principles of the invention, it will be understood that the invention may be embodied otherwise without departing from such principles.

The invention claimed is:

1. An adjustable vehicle seat comprising:
    a seat part;
    a backrest which can be pivoted relative to the seat part about a backrest pivot axis and can be locked in a design position, in which the backrest is approximately upright, and can be locked in a table position, in which the backrest rests on the seat part, the backrest being pivoted about a pivoting angle relative to the table position in the design position;
    two locking apparatuses assigned to the seat part to lock the seat part to a vehicle structure;
    an unlocking unit assigned to the backrest for unlocking the two locking apparatuses;
    a first Bowden cable connecting the unlocking unit to a first of the locking apparatuses;
    a second Bowden cable connecting the unlocking unit to a second of the locking apparatuses; and
    a leadthrough element assigned to the seat part, the leadthrough element having a first leadthrough opening for guiding through the first Bowden cable and having a second leadthrough opening for guiding through the second Bowden cable, the first leadthrough opening and the second leadthrough opening being arranged essentially at an identical spacing from the backrest pivot axis, and the leadthrough element being of approximately cylindrical configuration and being fastened to the seat part such that a leadthrough element cylinder axis is aligned with the backrest pivot axis.

2. The adjustable vehicle seat as claimed in claim 1, wherein the leadthrough element has a radially protruding fastening arm.

3. The adjustable vehicle seat as claimed in claim 1, wherein the leadthrough element has at least one radially protruding collar.

4. The adjustable vehicle seat as claimed in claim 1, wherein, during pivoting of the backrest from the design position into the table position, the leadthrough element rotates relative to the unlocking unit.

5. The adjustable vehicle seat as claimed in claim 1, wherein:
    the unlocking unit has an unlocking lever for unlocking the locking apparatuses; and
    in the design position, the leadthrough element prevents a movement of an unlocking lever.

6. The adjustable vehicle seat as claimed in claim 5, wherein:
    on one end side the leadthrough element has at least one diametrically running slot;
    a blocking lug is attached to the unlocking lever; and
    the at least one diametrically running slot interacts with the blocking lug.

7. The adjustable vehicle seat as claimed in claim 6, wherein the leadthrough element is arranged in such a way that, when the vehicle seat is situated in the design position, the slot runs obliquely with respect to a movement direction of the blocking lug.

8. The adjustable vehicle seat as claimed in claim 6, wherein the leadthrough element is arranged in such a way that, when the vehicle seat is situated in the table position, the slot runs in the same direction as the movement direction of the blocking lug.

9. The adjustable vehicle seat as claimed in claim 1, further comprising:

a first supporting point, from which the first Bowden cable is guided in a direct line to the first leadthrough opening; and a second supporting point, from which the second Bowden cable is guided in a direct line to the second leadthrough opening, the first supporting point and the second supporting point having a same spacing from the backrest pivot axis.

10. The adjustable vehicle seat as claimed in claim 9, wherein:

the unlocking unit comprises a first unlocking element with a cylinder segment region having a first unlocking element circumferential face;

the first supporting point is situated on the first unlocking element circumferential face of the cylinder segment region of the first unlocking element of the unlocking unit;

the unlocking unit comprises a second unlocking element with a cylinder segment region having a second unlocking element circumferential face;

the second supporting point is situated on the second unlocking element circumferential face of the cylinder segment region of the second unlocking element of the unlocking unit.

11. The adjustable vehicle seat as claimed in claim 10, wherein:

a first guide groove is formed in the first circumferential face;

the first Bowden cable is inserted into the first guide groove;

a second guide groove is formed in the second circumferential face; and the second Bowden cable is inserted into the second guide groove.

12. The adjustable vehicle seat as claimed in claim 9, wherein:

a first plane runs parallel to the backrest pivot axis and a first center point of the first leadthrough opening and a second center point of the second leadthrough opening lie in the first plane;

a second plane runs parallel to the backrest pivot axis and the first supporting point and the second supporting point lie in the second plane; and the first plane and the second plane lie offset with respect to one another by half the pivoting angle in the design position of the backrest.

13. The adjustable vehicle seat as claimed in claim 12, wherein the first plane and the second plane lie offset with respect to one another by half the pivoting angle in the table position of the backrest.

14. The adjustable vehicle seat as claimed in claim 12, wherein the backrest pivot axis lies in the first plane.

15. The adjustable vehicle seat as claimed in claim 12, wherein the backrest pivot axis lies in the second plane.

* * * * *